United States Patent
Xiao et al.

(10) Patent No.: US 12,260,055 B2
(45) Date of Patent: Mar. 25, 2025

(54) TOUCH DISPLAY PANEL AND TOUCH DISPLAY DEVICE

(71) Applicant: KunShan Go-Visionox Opto-Electronics Co., Ltd., Jiangsu (CN)

(72) Inventors: Jiangmei Xiao, Kunshan (CN); Shengzu Zhu, Kunshan (CN)

(73) Assignee: KunShan Go-Visionox Opto-Electronics Co., Ltd., Kunshan (CN)

( * ) Notice: Subject to any disclaimer, the term of this patent is extended or adjusted under 35 U.S.C. 154(b) by 0 days.

(21) Appl. No.: 17/987,552

(22) Filed: Nov. 15, 2022

(65) Prior Publication Data

US 2023/0070711 A1    Mar. 9, 2023

Related U.S. Application Data

(63) Continuation of application No. PCT/CN2021/101861, filed on Jun. 23, 2021.

(30) Foreign Application Priority Data

Aug. 11, 2020 (CN) .......................... 202010801070.2

(51) Int. Cl.
  *G06F 3/044* (2006.01)
(52) U.S. Cl.
  CPC .. *G06F 3/0446* (2019.05); *G06F 2203/04111* (2013.01)
(58) Field of Classification Search
  None
  See application file for complete search history.

(56) References Cited

U.S. PATENT DOCUMENTS

| 2014/0098305 A1 | 4/2014 | Mo et al. |
| 2020/0012370 A1 | 1/2020 | Luo et al. |

(Continued)

FOREIGN PATENT DOCUMENTS

| CN | 107291303 A | 10/2017 |
| CN | 108628497 A | 10/2018 |

(Continued)

OTHER PUBLICATIONS

PCT International Search Report for International Application No. PCT/CN2021/101861 dated Sep. 24, 2021.

(Continued)

*Primary Examiner* — Ifedayo B Iluyomade
(74) *Attorney, Agent, or Firm* — Rimon PC

(57) ABSTRACT

Disclosed by embodiments of the present application are a touch display panel and a touch display device, in a display area of a special-shaped touch unit, a first special-shaped touch lead is connected with a first special-shaped touch electrode block or a first touch electrode block, and a second special-shaped touch lead is connected with a second special-shaped touch electrode block or a second touch electrode block, and the first special-shaped touch lead and the second special-shaped touch lead cross and are insulated from each other to form a special-shaped touch compensation capacitor, thereby avoiding a channel of the first touch electrode or the second touch electrode is cut off due to the slotting or edge cutting of the special-shaped touch unit, that is, avoiding the poor touch performance of the special-shaped touch unit, and ensuring the touch performance of the special-shaped touch unit.

19 Claims, 3 Drawing Sheets

(56) References Cited

U.S. PATENT DOCUMENTS

| | | | | |
|---|---|---|---|---|
| 2021/0004126 A1* | 1/2021 | Jang | ...................... | G06F 3/0412 |
| 2022/0137732 A1* | 5/2022 | Lin | .................... | G06F 11/2221 |
| | | | | 345/173 |
| 2022/0391040 A1* | 12/2022 | Yan | ...................... | G06F 3/0412 |

FOREIGN PATENT DOCUMENTS

| | | | | | |
|---|---|---|---|---|---|
| CN | 208110574 | U | | 11/2018 | |
| CN | 109521594 | A | | 3/2019 | |
| CN | 109885200 | A | | 6/2019 | |
| CN | 109901748 | A | | 6/2019 | |
| CN | 110244873 | | * | 9/2019 | ........... G06F 3/0412 |
| CN | 110244873 | A | * | 9/2019 | ........... G06F 3/0412 |
| CN | 110308823 | | * | 10/2019 | ........... G06F 3/0416 |
| CN | 110308823 | A | * | 10/2019 | ........... G06F 3/0416 |
| CN | 201911307776 | | * | 12/2019 | ............ G06F 3/041 |
| CN | 111949158 | A | | 11/2020 | |

OTHER PUBLICATIONS

PCT Written opinion for International Application No. PCT/CN2021/101861 dated Sep. 24, 2021.

* cited by examiner

TOUCH DISPLAY PANEL AND TOUCH DISPLAY DEVICE

CROSS-REFERENCE TO RELATED APPLICATIONS

The present application is a continuation application of International Application No. PCT/CN2021/101861 filed on Jun. 23, 2021, which is based on and claims priority to a Chinese Patent Application No. CN202010801070.2 filed on Aug. 11, 2020, disclosures of which are hereby incorporated by reference in its entirety.

TECHNICAL FIELD

Embodiments of the present application relate to the field of touch display technologies, and in particular to a touch display panel and a touch display device.

BACKGROUND

With the continuous development of display panel technologies, people have higher and higher demand for large screen display. However, large screen display panels, such as full screen mobile phones, are facing some difficulties in design and manufacturing process. For example, at the position of earpiece and front camera, touch and display need to be slotted, which will cause part of touch cells at the position of the earpiece and the front camera to be cut off. The remaining touch cells after being cut off are very small, so it is difficult to ensure the touch performance of slotted edges. Therefore, there is an urgent need for a display panel structure that can ensure the touch performance of the slotted edge.

SUMMARY

In view of this, embodiments of the present application provide a touch display panel and a touch display device, which can solve the problem of poor touch performance of the slotted edge.

The first aspect of the present application provides a touch display panel. The touch display panel is provided with a display area and includes a touch electrode group located in the display area. The touch electrode group includes a plurality of first touch units, at least one special-shaped touch unit, and a special-shaped touch compensation capacitor. The plurality of first touch units include a plurality of first touch electrode blocks arranged along a first direction and a plurality of second touch electrode blocks arranged along a second direction intersected with the first direction, the plurality of first touch electrode blocks are connected along the first direction to form a plurality of first touch electrodes, the second touch electrode blocks are connected along the second direction to form a plurality of second touch electrodes, and the first touch electrodes and the second touch electrodes are insulated from each other and. The at least one special-shaped touch unit is adjacent to the first touch units and includes at least one of a first special-shaped touch electrode block arranged along the first direction and a second special-shaped touch electrode block arranged along the second direction. The special-shaped touch compensation capacitor includes a first special-shaped touch lead and a second special-shaped touch lead. The first special-shaped touch lead is connected with the first special-shaped touch electrode block or the first touch electrode block. The second special-shaped touch lead is connected with the second special-shaped touch electrode block or the second touch electrode block. The first special-shaped touch lead and the second special-shaped touch lead cross and are insulated from each other.

According to another aspect of the present application, a touch display device is provided by an embodiment of the present application. The touch display device includes a touch display panel.

A touch display panel and a touch display device are provided by the embodiments of the present application, in the display area of the special-shaped touch unit, a first special-shaped touch lead is set to connect with the first special-shaped touch electrode block or the first touch electrode block, and a second special-shaped touch lead is set to connect with the second special-shaped touch electrode block or the second touch electrode block, and the first special-shaped touch lead and the second special-shaped touch lead are set to cross and be insulated from each other to form a special-shaped touch compensation capacitor, thereby avoiding the cutting of the first touch electrode or the second touch electrode due to the slotting or edge cutting of the special-shaped touch unit, that is, avoiding the poor touch performance of the special-shaped touch unit, and ensuring the touch performance of the special-shaped touch unit.

DETAILED DESCRIPTION OF THE EMBODIMENTS

Technical solutions in embodiments of the present application will be clearly and completely described below with reference to accompanying drawings in the embodiments of the present application.

Figure 1:
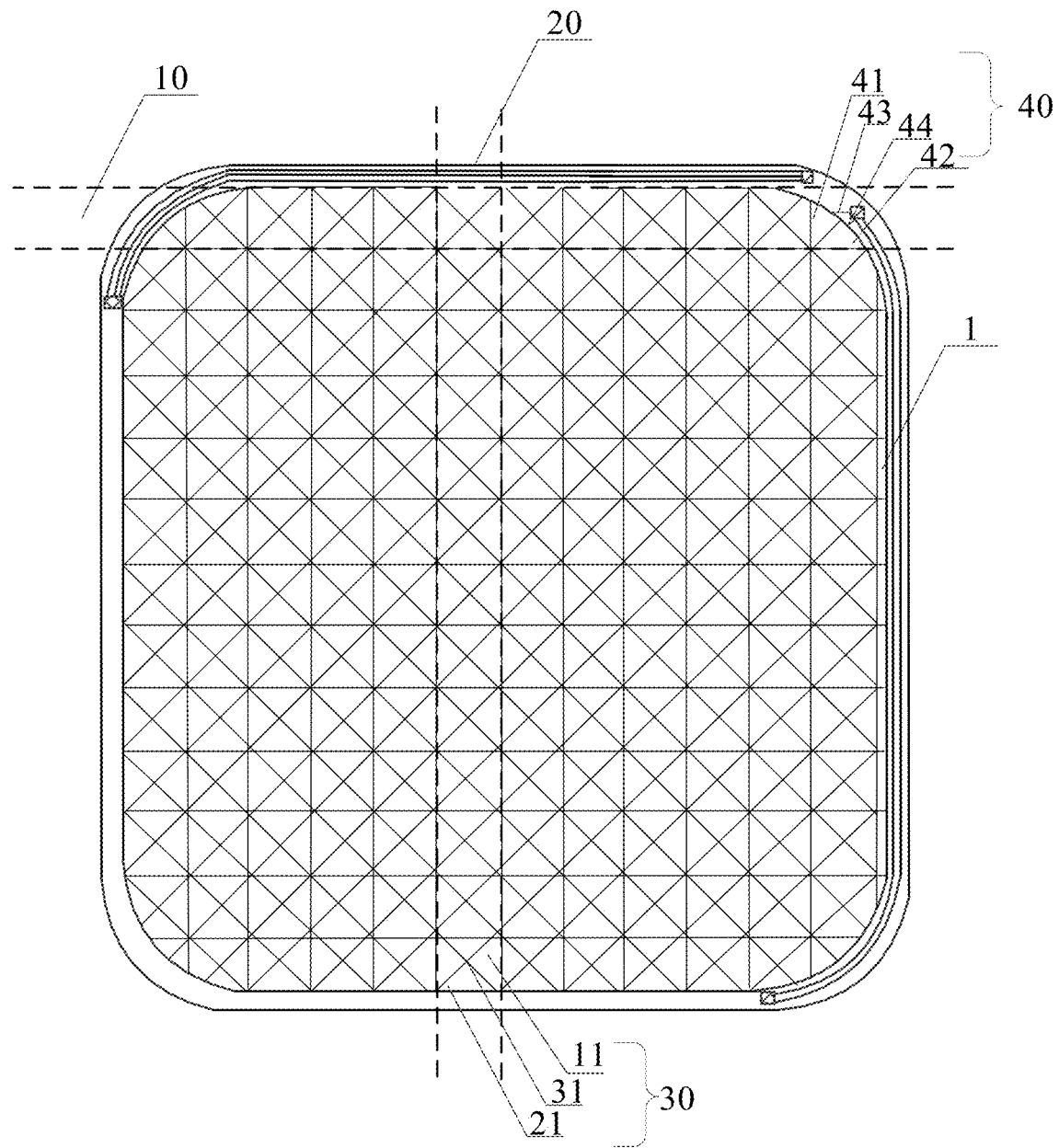
FIG. 1 shows a schematic structural diagram of a touch display panel according to an embodiment of the present application.

As shown in FIG. 1, a touch display panel is provided with a display area 1 and includes a touch electrode group located in the display area 1. The touch electrode group includes a plurality of first touch units 30. The plurality of first touch units 30 includes a plurality of first touch electrode blocks 11 arranged along a first direction and a plurality of second touch electrode blocks 21 arranged along a second direction intersected with the first direction. The plurality of first touch electrode blocks 11 are connected along the first direction to form a plurality of first touch electrodes 10. The plurality of second touch electrode blocks 21 are connected along the second direction to form a plurality of second touch electrodes 20. The first touch electrodes 10 and the second touch electrodes 20 are insulated from each other and the orthographic projection of the first touch electrodes is intersected with the orthographic projection of the second touch electrodes along a thickness direction of the touch display panel, and a plurality of first bridge points 31 are formed at the overlap of the first touch electrodes 10 and the second touch electrodes 20.

The touch electrode group further includes at least one special-shaped touch unit 40 adjacent to the first touch units 30. The special-shaped touch unit 40 includes at least one of a first special-shaped touch electrode block 41 arranged along the first direction and a second special-shaped touch electrode block 42 arranged along the second direction. The touch electrode group further includes a special-shaped touch compensation capacitor. The special-shaped touch compensation capacitor includes a first special-shaped touch lead 43 and a second special-shaped touch lead 44. The second special-shaped touch lead 44 and the first special-shaped touch lead 43 are insulated from each other and the orthographic projection of the first special-shaped touch lead is intersected with the orthographic projection of the second special-shaped touch lead along the thickness direction. The first special-shaped touch lead 43 is configured to connect with to the first special-shaped touch electrode block 41 or the first touch electrode block 11. The second special-shaped touch lead 44 is configured to connect with the second special-shaped touch electrode block 42 or the second touch electrode block 21.

For example, in the embodiments of the present application, the area of the special-shaped touch unit 40 is less than that of the first touch unit 30. Specifically, the area of a first special-shaped touch electrode block 41 is less than that of two first touch electrode blocks 11, and the area of the second special-shaped touch electrode block 42 is less than that of two second touch electrode blocks 21. That is, the number of the first special-shaped touch electrode block may be one or two, no matter whether the number of the first special-shaped touch electrode block is one or two, as long as the total area of the first special-shaped touch electrode block is less than the first touch electrode block. The number of the second special-shaped touch electrode block may be one or two, as long as the total area of the second special-shaped touch electrode block is less than the second touch electrode block. In the embodiments of the application, the area of at least one of the first special-shaped touch electrode block and the second special-shaped touch electrode block can be reduced to realize that the area of the special-shaped touch unit 40 is less than that of the first touch unit 30.

In addition, the first special-shaped touch electrode block 41 and the second special-shaped touch electrode block 42 of the special-shaped touch unit 40 do not overlap, that is, a bridge point does not be formed between the first special-shaped touch electrode block 41 and the second special-shaped touch electrode block 42. At this time, the first special-shaped touch electrode block is provided with a first special-shaped touch electrode line, and the second special-shaped touch electrode block is provided with a second special-shaped touch electrode line.

The first touch unit 30 refers to a complete touch unit, such as a touch unit at a non-boundary position in the display area 1. The plurality of complete touch units constitute the complete first touch electrode 10 and the complete second touch electrode 20. Each first touch electrode 10 is in a strip structure, and each second touch electrode 20 is in a strip structure.

In an embodiment, the first touch electrode blocks in each first touch unit 30 include first touch electrode blocks, and the second touch electrode blocks in each first touch unit 30 includes two second touch electrode blocks, and the two first touch electrode blocks and the two second touch electrode blocks are insulated from each other and the orthographic projection of the first touch blocks is intersected with the orthographic projection of the second touch blocks along the thickness direction.

Because many display panels (such as display panels of mobile phone, etc.) have the functions of calling and taking pictures, earpieces are usually required to be set to realize the function of calling, and cameras, especially front cameras, are also required to be set to realize the function of taking pictures. A touch film layer and a display film layer on the display side of the display panel need to be slotted for providing with earpieces and front cameras so as to form a special-shaped touch unit. With people's continuous pursuit of large screen display, there are more and more narrow borders and full screens. To realize narrow borders and full screens, it is necessary to realize the display and touch functions at the edge of the display panel, that is, a touch unit also needs to be set at the edge of the display panel. However, a touch cell near the edge of the display panel (especially the special-shaped edge, such as arc edge) or near the slotted position is likely to be not a normal touch unit, that is, the touch unit here is a special-shaped touch unit. For the special-shaped touch unit, especially the special-shaped touch unit at the slotted position, because part of the touch film will be cut off after slotting, part or all of touch channels may be cut off in the special-shaped touch unit at the slotted position, thereby resulting in poor touch function or even no touch function of the special-shaped touch unit.

In order to realize the touch function of the special-shaped touch unit, the first special-shaped touch lead 43 connecting with the first special-shaped touch electrode block 41 or the first touch electrode block 11 and the second special-shaped touch lead 44 connecting with the second special-shaped touch electrode block 42 or the second touch electrode block 21 are provided by the embodiments of the present application. The first special-shaped touch lead 43 and the second special-shaped touch lead 44 are insulated from each other and the orthographic projection of the first special-shaped touch lead is intersected with the orthographic projection of the second special-shaped touch lead along the thickness direction to form the special-shaped touch compensation capacitor, thereby ensuring touch function of the special-shaped touch unit 40.

It should be understood that if only the first special-shaped touch electrode block 41 or the second special-shaped touch electrode block 42 remains after slotting the special-shaped touch unit 40 in the embodiments of the present application, that is, only one of the first touch electrode 10 and the second touch electrode 20 is cut off, in this case, it is only necessary to reconstruct the cut-off first touch electrode 10 or the cut-off second touch electrode 20. If both the first touch electrode 10 and the second touch electrode 20 are cut off, it is necessary to communicate with the first touch electrode 10 and the second touch electrode 20 at the same time. The specific implementation method of communicating with the first touch electrode 10 or the second touch electrode 20 is to add corresponding special-shaped touch leads, that is, add the first special-shaped touch lead 43 or the second special-shaped touch lead 44, and the first special-shaped touch lead 43 extends along the first direction and the second special-shaped touch lead 44 extends along the second direction. The first touch electrode 10 in the first direction is communicated by constructing the first special-shaped touch lead 43, and the second touch electrode 20 in the second direction is communicated by constructing the second special-shaped touch lead 44. The first special-shaped touch lead 43 and the second special-shaped touch lead 44 are insulated from each other and the orthographic projection of the first special-shaped touch lead is intersected with the orthographic projection of the second special-shaped touch lead along the thickness direction to form the special-shaped touch compensation capacitor, that is, the touch function of the special-shaped touch unit 40 is realized. By recommunicating at least one of the first touch electrode 10 and the second touch electrode 20, the integrity of the touch channels in the first direction and the second direction is realized, the touch function of the special-shaped touch unit 40 is realized, and the user's touch experience is improved.

In a touch display panel provided by the embodiments of the application, a first special-shaped touch lead connecting with the first special-shaped touch electrode block or the first touch electrode block and a second special-shaped touch lead connecting with the second special-shaped touch electrode block or the second touch electrode block are arranged in the special-shaped touch unit in the display area, and the first special-shaped touch lead and the second special-shaped touch lead are insulated from each other and the orthographic projection of the first special-shaped touch lead is intersected with the orthographic projection of the second special-shaped touch lead along the thickness direction to form the special-shaped touch compensation capacitor, thereby a voiding cutting off the first touch electrode or the second touch electrode due to the slotting or edge cutting of the special-shaped touch unit, that is, a voiding the poor touch performance of the special-shaped touch unit, and ensuring the touch performance of the special-shaped touch unit.

In some embodiments of the application, the setting position of a special-shaped touch unit 40 may not disconnect the first touch electrode 10 and the second touch electrode 20, that is, the first touch electrode 10 and the second touch electrode 20 are continuously arranged. Specifically, the at least one special-shaped touch unit 40 is located at the ends of the first touch electrode 10 and the second touch electrode 20 (for example, it is usually located at the four corners of the display panel).

As shown in FIG. 1, the shaped touch unit 40 includes the first special-shaped touch electrode block 41 (an electrode block along the transverse direction in FIG. 1) and the second special-shaped touch electrode block 42 (the electrode block along the longitudinal direction in FIG. 1). The first special-shaped touch lead 43 is electrically connected with the first special-shaped touch electrode block 41, the second special-shaped touch lead 44 is electrically connected with the second special-shaped touch electrode block 42, and the first special-shaped touch lead 43 is located on the extension line of the first touch electrode 10, or the second special-shaped touch lead 44 is located on the extension line of the second touch electrode 20, or the first special-shaped touch lead 43 is located on the extension line of the first touch electrode 10, and the second special-shaped touch lead 44 is located on the extension line of the second touch electrode 20.

In other embodiments of the present application, the special-shaped touch unit only includes one of the at least one first special-shaped touch electrode block 41 and the at least one second special-shaped touch electrode block 42. When the special-shaped touch unit only includes the at least one first special-shaped touch electrode block 41 (at this time, special-shaped electrode blocks of the special-shaped touch unit along the second direction are cut off), the first special-shaped touch lead 43 is electrically connected with the first special-shaped touch electrode block 41, and the second touch electrode block 21 of one of the first touch units 30 adjacent to the special-shaped touch unit is electrically connected with the second special-shaped touch lead 44. The first special-shaped touch lead 43 and the second special-shaped touch lead 44 are insulated from each other and the orthographic projection of the first special-shaped touch lead is intersected with the orthographic projection of the second special-shaped touch lead along the thickness direction to form the special-shaped touch compensation capacitor. When the special-shaped touch unit only includes the at least one second special-shaped touch electrode block 42 (at this time, electrode blocks of the special-shaped touch unit along the first direction are cut off), the first touch electrode block 11 of one of the first touch units 30 adjacent to the special-shaped touch unit is electrically connected with the first special-shaped touch lead 43, and the second special-shaped touch lead 44 is electrically connected with the second special-shaped touch electrode block 42. The first special-shaped touch lead 43 and the second special-shaped touch lead 44 are insulated from each other and the orthographic projection of the first special-shaped touch lead is intersected with the orthographic projection of the second special-shaped touch lead along the thickness direction to form the special-shaped touch compensation capacitor.

The conductive communication of the special-shaped touch unit 40 located at an end of the first touch electrode 10 along the first direction is realized by the first special-shaped touch lead 41, and the conductive communication of the special-shaped touch unit 40 located at an end of the second touch electrode 20 along the second direction is realized by the second special-shaped touch lead 42. And the first special-shaped touch lead 43 and the second special-shaped touch lead 44 are insulated from each other and the orthographic projection of the first special-shaped touch lead is intersected with the orthographic projection of the second special-shaped touch lead along the thickness direction to form the special-shaped touch compensation capacitor, thereby realizing the touch function of the special-shaped touch unit 40.

In an embodiment, the special-shaped touch unit 40 may disconnect at least one of the first touch electrode 10 and the second touch electrode 20, that is, the special-shaped touch unit 40 is located inside at least one of the first touch electrode 10 and the second touch electrode 20. Specifically, when the special-shaped touch unit 40 includes one special-shaped touch unit, the special-shaped touch unit 40 cuts off at least one of the first touch electrode 10 and the second touch electrode 20. The special-shaped touch unit 40 includes at least one of the first special-shaped touch electrode block 41 and the second special-shaped touch electrode block 42. The first special-shaped touch lead 43 is connected with the first special-shaped touch electrode block 41 or the first touch electrode block 11. The second special-shaped touch lead 44 is connected with the second special-shaped touch electrode block 42 or the second touch electrode block 21, and the first special-shaped touch lead 43 and the second special-shaped touch lead 44 are insulated from each other and the orthographic projection of the first special-shaped touch lead is intersected with the orthographic projection of the second special-shaped touch lead along the thickness direction to form the special-shaped touch compensation capacitor.

Figure 2:
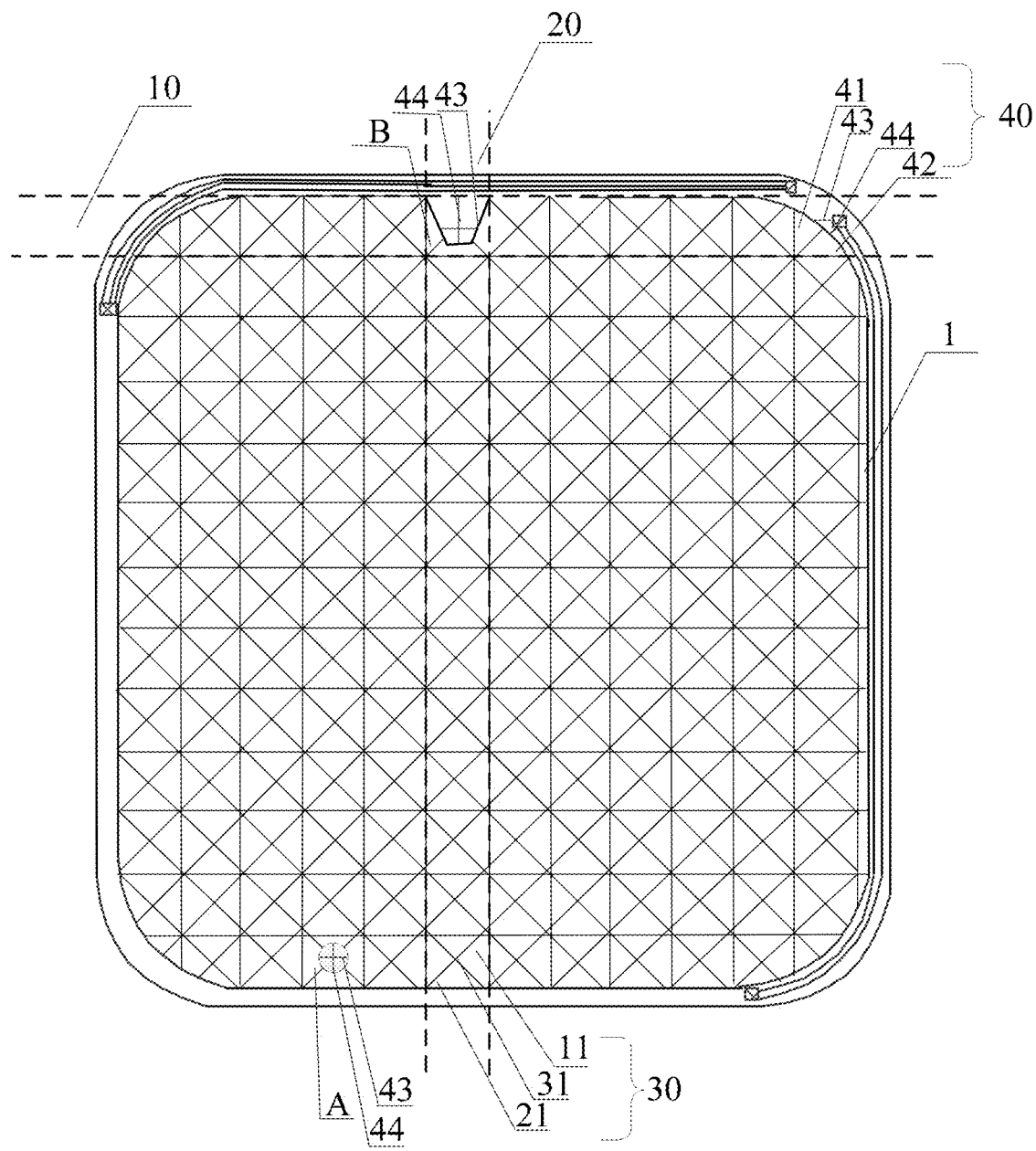
FIG. 2 shows a schematic structural diagram of a touch display panel according to another embodiment of the present application.

As shown in FIG. 2, when the special-shaped touch unit includes one special-shaped touch unit, such as a special-shaped touch unit A, the special-shaped touch unit A separates the first touch electrode 10 from the second touch electrode 20, that is, the special-shaped touch unit is located in the display area (there are other first touch units 30 around the special-shaped touch unit). In this embodiment, the special-shaped touch unit A includes the first special-shaped touch electrode block 41 and the second special-shaped touch electrode block 42. The first special-shaped touch lead 43 is electrically connected with the first special-shaped touch electrode block 41, the second special-shaped touch lead 44 is electrically connected with the second special-shaped touch electrode block 42, and the first special-shaped touch lead 43 and the second special-shaped touch lead 44 are insulated from each other and the orthographic projection of the first special-shaped touch lead is intersected with the orthographic projection of the second special-shaped touch lead along the thickness direction to form the special-shaped touch compensation capacitor.

In another embodiment of the present application, as shown in FIG. 2, the special-shaped touch unit 40 disconnects the first touch electrode 10 and the second touch electrode 20 at the same time, and the special-shaped touch unit 40 only includes the at least one first special-shaped touch electrode block 41 or the at least one second special-shaped touch electrode block 42. The following description will be made by taking the special-shaped touch unit 40 only including the first special-shaped touch electrode block 41 as an example. The first special-shaped touch lead 43 is electrically connected with the first special-shaped touch electrode block 41, the second special-shaped touch lead 44 is electrically connected with the second touch electrode block 21 of the adjacent first touch unit 30, and the first special-shaped touch lead 43 and the second special-shaped touch lead 44 are insulated from each other and the orthographic projection of the first special-shaped touch lead is intersected with the orthographic projection of the second special-shaped touch lead along the thickness direction to form the special-shaped touch compensation capacitor. The special-shaped touch unit 40 only includes the at least one second special-shaped touch electrode block 42, which is similar to the above, that is, the first special-shaped touch lead 43 is electrically connected with the second touch electrode block 21 of the adjacent first touch unit 30, the second special-shaped touch lead 44 is electrically connected with the second special-shaped touch electrode block 42, and the first special-shaped touch lead 43 and the second special-shaped touch lead 44 are insulated from each other and the orthographic projection of the first special-shaped touch lead is intersected with the orthographic projection of the second special-shaped touch lead along the thickness direction to form the special-shaped touch compensation capacitor.

In another embodiment of the application, the special-shaped touch unit 40 may also disconnect only the first touch electrode 10 or the second touch electrode 20, that is, the special-shaped touch unit 40 is located at an end of one of the first touch electrode 10 and the second touch electrode 20 and inside the other. As shown in FIG. 2, a special-shaped touch unit B disconnects the first touch electrode 10, the first special-shaped touch lead 43 is electrically connected with the first special-shaped touch electrode block 41, the second special-shaped touch lead 44 is electrically connected with the second special-shaped touch electrode block 42, and the first special-shaped touch lead 43 and the second special-shaped touch lead 44 are insulated from each other and the orthographic projection of the first special-shaped touch lead is intersected with the orthographic projection of the second special-shaped touch lead along the thickness direction to form the special-shaped touch compensation capacitor.

FIG. 2 shows only one case where the special-shaped touch unit 40 disconnects the first touch electrode 10. When the special-shaped touch unit 40 disconnects the second touch electrode 20, the first special-shaped touch lead 43 is electrically connected with the first special-shaped touch electrode block 41, the second special-shaped touch lead 44 is electrically connected with the second special-shaped touch electrode block 42, and the first special-shaped touch lead 43 and the second special-shaped touch lead 44 are insulated from each other and the orthographic projection of the first special-shaped touch lead is intersected with the orthographic projection of the second special-shaped touch lead along the thickness direction to form the special-shaped touch compensation capacitor.

It should be understood that FIG. 2 only shows the case that the special-shaped touch unit 40 includes both the at least one first special-shaped touch electrode block 41 and the at least one second special-shaped touch electrode block 42. When the special-shaped touch unit 40 can also include only the first special-shaped touch electrode block 41 or the second special-shaped touch electrode block 42, take the special-shaped touch unit 40 only including the first special-shaped touch electrode block 41 and the first touch electrode 10 disconnected as an example, at this time, the first special-shaped touch lead 43 is electrically connected with the first special-shaped touch electrode block 41, the second special-shaped touch lead 44 is electrically connected with the second touch electrode block 21 of the adjacent first touch unit 30, and the first special-shaped touch lead 43 and the second special-shaped touch lead 44 are insulated from each other and the orthographic projection of the first special-shaped touch lead is intersected with the orthographic projection of the second special-shaped touch lead along the thickness direction to form the special-shaped touch compensation capacitor.

Figure 3:
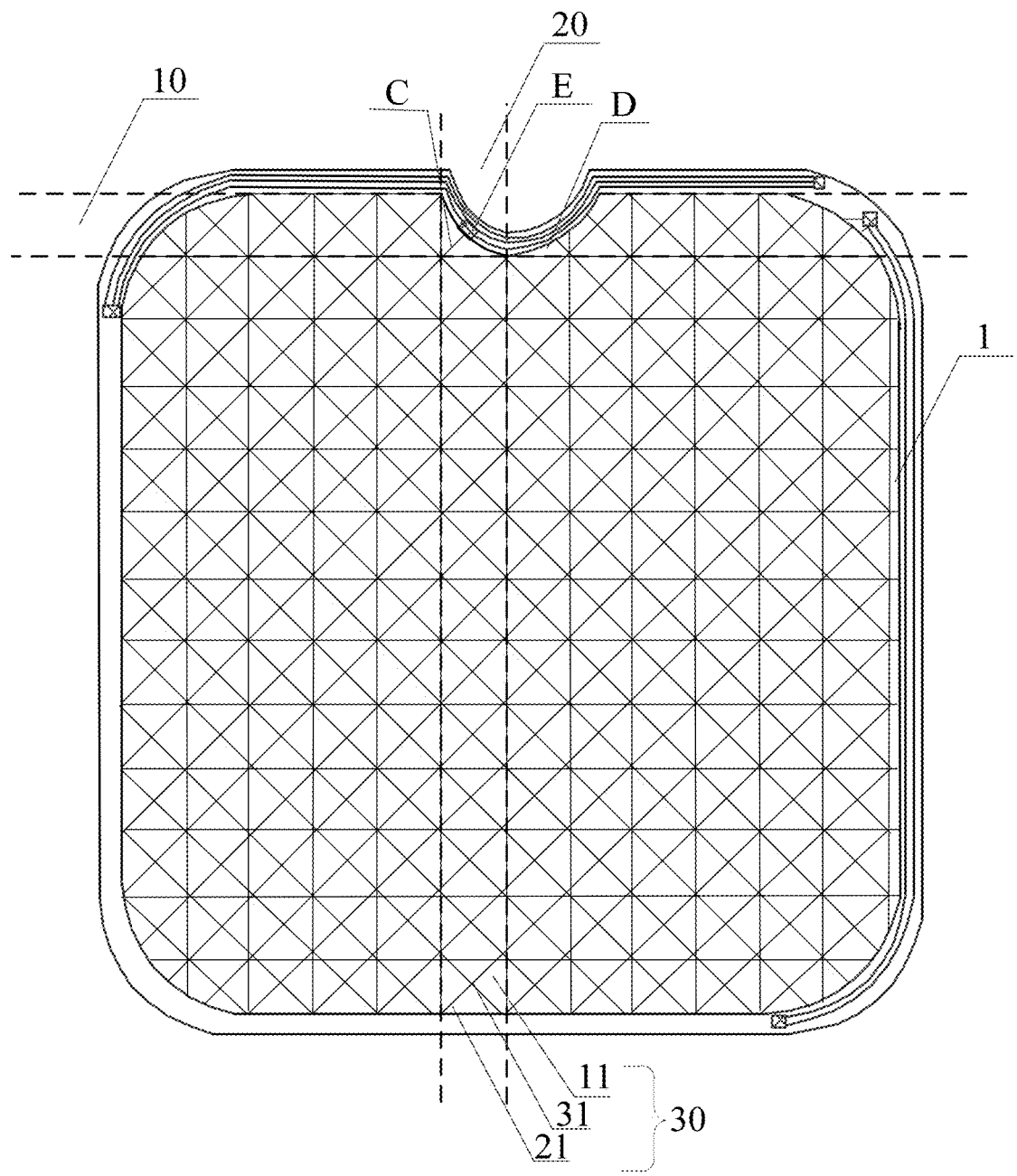
FIG. 3 shows a schematic structural diagram of a touch display panel according to still another embodiment of the present application.

As shown in FIG. 3, the special-shaped touch unit may be two or more and disconnect at least one of the first touch electrode 10 and the second touch electrode 20. Specifically, the following description will be made by taking two special-shaped touch units as an example. As shown in FIG. 3, a special-shaped touch unit C and a special-shaped touch unit D disconnect the first touch electrode 10. The special-shaped touch unit C and the special-shaped touch unit D respectively include the first special-shaped touch electrode block 41 and the second special-shaped touch electrode block 42 at the same time. The two first special-shaped touch electrode blocks 41 are connected simultaneously through one first special-shaped touch lead 43. Two second special-shaped touch electrode blocks 42 are respectively connected through two second special-shaped touch leads 44 to lead them out. Therefore, one first special-shaped touch lead 43 and two second special-shaped touch leads 44 are insulated from each other and the orthographic projection of the first special-shaped touch lead is intersected with the orthographic projection of the second special-shaped touch lead along the thickness direction to form two special-shaped touch compensation capacitors.

It should be understood that, similarly, when the two special-shaped touch units 40 disconnect the second touch electrode 20, two first special-shaped touch leads 43 are respectively connected with the two first special-shaped touch electrode blocks 41 to lead them out, and the two second special-shaped touch electrode blocks 42 are connected through one second special-shaped touch lead 44. Therefore, two first special-shaped touch leads 43 and one second special-shaped touch leads 44 are insulated from each other and the orthographic projection of the first special-shaped touch lead is intersected with the orthographic projection of the second special-shaped touch lead along the thickness direction to form two special-shaped touch compensation capacitors.

It should also be understood that FIG. 3 only shows the case where the two special-shaped touch units 40 both include the first special-shaped touch electrode block 41 and the second special-shaped touch electrode block 42. When the special-shaped touch unit 40 only includes the at least one first special-shaped touch electrode block 41 or the at least one second special-shaped touch electrode block 42, take the special-shaped touch unit 40 only including the first special-shaped touch electrode block 41 and disconnecting the first touch electrode 10 as an example, at this time, the first special-shaped touch lead 43 is electrically connected with the first special-shaped touch electrode block 41, the second special-shaped touch lead 44 is electrically connected with the second touch electrode block 21 of the adjacent first touch unit 30, and the first special-shaped touch lead 43 and the second special-shaped touch lead 44 are insulated from each other and the orthographic projection of the first special-shaped touch lead is intersected with the orthographic projection of the second special-shaped touch lead along the thickness direction to form the special-shaped touch compensation capacitor.

In an embodiment of the present application, when there are more than two special-shaped touch units, the following description will be made by taking the special-shaped touch unit disconnecting the first touch electrode 10 as an example. At this time, the first special-shaped touch electrode blocks 41 at both ends of the adjacent plurality of special-shaped touch units are electrically connected through one first special-shaped touch lead 43, and the second special-shaped touch electrode blocks 42 of the adjacent plurality of special-shaped touch units are electrically connected through a plurality of second special-shaped touch leads 44. One first special-shaped touch lead 43 and the plurality of second special-shaped touch leads 44 are insulated from each other and the orthographic projection of the first special-shaped touch lead is intersected with the orthographic projection of the second special-shaped touch lead along the thickness direction to form a plurality of special-shaped touch compensation capacitors. It should be understood that there may be a special-shaped touch unit 40 excluding the second special-shaped touch electrode 42 in the adjacent plurality of special-shaped touch units, at this time, a plurality of second special-shaped touch leads 44 are arranged to respectively connect with the second touch electrodes of the first touch units located between the plurality of special-shaped touch units. The plurality of second special-shaped touch leads 44 and the first special-shaped touch lead 43 are insulated from each other and the orthographic projection of the first special-shaped touch lead is intersected with the orthographic projection of the second special-shaped touch lead along the thickness direction to form the special-shaped touch compensation capacitor of the special-shaped touch unit 40 excluding the second special-shaped touch electrode 42.

In an embodiment of the present application, as shown in FIG. 3, the touch function of the special-shaped touch unit 40 is realized by setting the first special-shaped touch lead 43 and the second special-shaped touch lead 44 to communicate the disconnected first touch electrode 10 or the disconnected second touch electrode 20, and an insulation crossing point of the first special-shaped touch lead 43 and the second special-shaped touch lead 44 is located at the position of a signal lead wire of the special-shaped touch unit 40. At position E shown in FIG. 3, by setting the insulation crossing point of the first special-shaped touch lead 43 and the second special-shaped touch lead 44 (a crossing point of orthographic projection on the touch display panel) at the position of the signal lead wire, the problem of poor touch uniformity caused by excessive capacitance values due to excessive superposition of capacitance values in the first touch electrode 10 or the second touch electrode 20 is avoided, and the touch experience is improved. It should be understood that the specific number of the insulation crossing point of the first special-shaped touch lead 43 and the second special-shaped touch lead 44 may be selected according to the requirements of the actual application scenario, as long as the selected specific number can ensure the touch uniformity of each part of the first touch electrode 10 and the second touch electrode 20, and the specific number of the insulation crossing point of the first special-shaped touch lead 43 and the second special-shaped touch lead 44 is not limited by the embodiments of the present application.

In an embodiment of the present application, the insulation crossing point of the first special-shaped touch lead 43 and the second special-shaped touch lead 44 may only have one crossing point. By setting the insulation crossing point of the first special-shaped touch lead 43 and the second special-shaped touch lead 44 to be one crossing point, the problem of poor touch uniformity caused by excessive capacitance values due to excessive superposition of capacitance values in the first touch electrode 10 or the second touch electrode 20, can be further avoided, and the touch experience is further improved. It should be understood that the specific number of insulation crossing point of the first special-shaped touch lead 43 and the second special-shaped touch lead 44 can be selected according to the requirements of the actual application scenario, as long as the selected specific number of crossing points can ensure the touch uniformity of each part of the first touch electrode 10 and the second touch electrode 20. The specific number of insulation crossing points of the first special-shaped touch lead 43 and the second special-shaped touch lead 44 is not limited by the embodiments of the present application.

In an embodiment, as shown in FIG. 2, the insulation crossing point of the first special-shaped touch lead 43 and the second special-shaped touch lead 44 may be located in the display area 1. The first special-shaped touch electrode block 41 or the second special-shaped touch electrode block 42 of the grooved special-shaped touch unit 40 may be partially cut off. At this time, it is only necessary to communicate with the first touch electrode 10 or the second touch electrode 20 through the first special-shaped touch lead 43 and the second special-shaped touch lead 44, and set the insulation crossing point of the first special-shaped touch lead 43 and the second special-shaped touch lead 44 in the display area 1, that is, the orthographic projection of the first special-shaped touch lead 43 and the orthographic projection of the second special-shaped touch lead 44 on the touch display panel intersect in the display area 1, for example, in the insulation crossing position of the first special-shaped touch lead 43 and the second special-shaped touch lead 44 in FIG. 2. By setting the insulation crossing point of the first special-shaped touch lead 43 and the second special-shaped touch lead 44 in the display area 1, the area of the first special-shaped touch electrode block 41 and the area of the second special-shaped touch electrode block 42 can be ensured, thereby improving the touch performance of the special-shaped touch unit 40 and improving the touch experience. It should be understood that the specific location of the insulation crossing point of the first special-shaped touch lead 43 and the second special-shaped touch lead 44 can be selected according to the requirements of the actual application scenario, as long as the specific location of the selected crossing point can ensure the touch performance of the special-shaped touch unit 40, and the specific location of the insulation crossing point of the first special-shaped touch lead 43 and the second special-shaped touch lead 44 is not limited by the embodiments of the present application.

In an embodiment of the present application, the area of the first special-shaped touch electrode block 41 and the area of the second special-shaped touch electrode block 42 are equal. By setting the area of the first special-shaped touch electrode block 41 and the second special-shaped touch electrode block 42 of the special-shaped touch unit 40 to be equal or similar, the touch performance of the special-shaped touch unit 40 is ensured. It should be understood that the area relationship between the first special-shaped touch electrode block 41 and the second special-shaped touch electrode block 42 can be selected according to the requirements of the actual application scenario. For example, it is only necessary to set the area of the first special-shaped touch electrode block 41 and the area of the second special-shaped touch electrode block 42 to be greater than a certain area threshold to ensure the touch performance of the special-shaped touch unit 40. As long as the selected area relationship between the first special-shaped touch electrode block 41 and the second special-shaped touch electrode block 42 can ensure the touch performance of the special-shaped touch unit 40, the area relationship between the first special-shaped touch electrode block 41 and the second special-shaped touch electrode block 42 is not limited by the embodiments of the present application.

In an embodiment of the present application, the first touch electrode block 11, the second touch electrode block 21, the first special-shaped touch electrode block 41 and the second special-shaped touch electrode block 42 may include any one of the following materials: indium tin oxide, copper, silver and graphene. It should be understood that the specific material can be selected according to the requirements of the actual application scene, as long as the selected material can ensure the touch performance of the special-shaped touch unit 40. There is no limitation on the specific material of the first touch electrode block 11, the second touch electrode block 21, the first special-shaped touch electrode block 41 and the second special-shaped touch electrode block 42 in the embodiments of the present application.

In an embodiment of the present application, the first special-shaped touch lead 43 is connected through the signal lead wire, and the second special-shaped touch lead 44 can also be connected through the signal lead wire. By setting a signal lead wire, and utilizing the signal lead wire to connect with the first special-shaped touch lead 43 or the second special-shaped touch lead 44 in order to connect with the first touch electrode 10 or the second touch electrode 20, the problem of poor touch uniformity caused by excessive capacitance values due to excessive superposition of capacitance values in the first touch electrode 10 or the second touch electrode 20 is avoided, and the touch experience is improved.

In an embodiment of the present application, the first direction and the second direction may be perpendicular. By setting the first direction and the second direction perpendicular to each other, it is equivalent to establishing two coordinate axes (i.e. the first direction and the second direction) perpendicular to each other on the touch panel, the specific position of the user's touch can be more conveniently and accurately known, and accurate and rapid touch response is realized and the touch experience is improved. It should be understood that the angle between the first direction and the second direction can be selected according to the requirements of the actual application scenario, as long as the selected angle can ensure accurate and rapid touch positioning, the specific angle between the first direction and the second direction is not limited by the embodiments of the present application.

A touch display device is provided by an embodiment of the present application. The touch display device includes a touch display panel in any one of above embodiments. In the touch display device provided by an embodiment of the present application, a first special-shaped touch lead is set to connect with a first special-shaped touch electrode block or a first touch electrode block, and a second special-shaped touch lead is set to connect a second special-shaped touch electrode block or a second touch electrode block in the display area of a special-shaped touch unit, and the first special-shaped touch lead and the second special-shaped touch lead are set to be insulated and the orthographic projection of the first special-shaped touch lead is intersected with the orthographic projection of the second special-shaped touch lead along the thickness direction to form the special-shaped touch compensation capacitor, thereby avoiding the poor touch performance caused by the cutting of a first touch electrode or a second touch electrode caused by the slotting and cutting of the special-shaped touch unit, and ensuring the touch performance.

The above are only preferred embodiments of the present application and are not intended to limit the present application. Any modification, equivalent replacement, etc. made within the spirit and principle of the present application shall be included in the protection scope of the present application.

What is claimed is:

1. A touch display panel, provided with a display area and comprising a touch electrode group located in the display area, wherein the touch electrode group comprises: a plurality of first touch units comprising a plurality of first touch electrode blocks arranged along a first direction and a plurality of second touch electrode blocks arranged along a second direction intersected with the first direction, wherein the plurality of first touch electrode blocks are connected along the first direction to form a plurality of first touch electrodes, and the plurality of second touch electrode blocks are connected along the second direction to form a plurality of second touch electrodes, the first touch electrodes and the second touch electrodes are insulated from each other and the orthographic projection of the first touch electrodes is intersected with the orthographic projection of the second touch electrodes along a thickness direction of the touch display panel; at least one special-shaped touch unit adjacent to the first touch units and comprising at least one of a first special-shaped touch electrode block arranged along the first direction or a second special-shaped touch electrode block arranged along the second direction, an area of the special-shaped touch unit is less than an area of any of the first touch units; a special-shaped touch compensation capacitor comprising a first special-shaped touch lead connecting with the first special-shaped touch electrode block or the first touch electrode blocks and a second special-shaped touch lead connecting with the second special-shaped touch electrode block or the second touch electrode blocks, wherein the first special-shaped touch lead and the second special-shaped touch lead are insulated from each other and the orthographic projection of the first special-shaped touch lead is intersected with the orthographic projection of the second special-shaped touch lead along the thickness direction, and in a plan view, an intersection area where the orthographic projection of the first special-shaped touch lead is intersected with the orthographic projection of the second special-shaped touch lead is spaced apart from the orthographic projection of the first touch electrodes blocks and the orthographic projection of the second touch electrodes blocks; and the touch display panel further comprises a touch film layer slotted to define a slot, the first special-shaped touch lead and the second special-shaped touch lead are located in the slot in a plan view, and a side wall of the first special-shaped touch electrode block and the second special-shaped touch electrode block faces the slot and surrounds a part of the slot, wherein the first special-shaped touch electrode block and the second special-shaped touch electrode block share a common edge with the slot in the plan view.

2. The touch display panel of claim 1, wherein the first touch electrodes and the second touch electrodes are continuously arranged, and the at least one special-shaped touch unit is located at ends of the first touch electrodes and the second touch electrodes; one end of the first special-shaped touch lead is electrically connected with the first special-shaped touch electrode block or the first touch electrode blocks, and the other end of the first special-shaped touch lead extends to an area outside the display area; one end of the second special-shaped touch lead is electrically connected with the second special-shaped touch electrode block or the second touch electrode blocks and the other end of the second special-shaped touch lead extends to an area outside the display area.

3. The touch display panel of claim 2, wherein the special-shaped touch unit comprises the at least one first special-shaped touch electrode block and the at least one second special-shaped touch electrode block, the first special-shaped touch lead is connected with the first special-shaped touch electrode block, the second special-shaped touch lead is electrically connected with the second special-shaped touch electrode block, and the first special-shaped touch lead and the second special-shaped touch lead are insulated from each other and the orthographic projection of the first special-shaped touch lead is intersected with the orthographic projection of the second special-shaped touch lead along the thickness direction.

4. The touch display panel of claim 2, wherein the special-shaped touch unit only comprises the at least one first special-shaped touch electrode block, the first special-shaped touch lead is connected with the first special-shaped touch electrode block, the second special-shaped touch lead is in direct contact with a second touch electrode block of one of the first touch units adjacent to the special-shaped touch unit, and the first special-shaped touch lead and the second special-shaped touch lead are insulated from each other and the orthographic projection of the first special-shaped touch lead is intersected with the orthographic projection of the second special-shaped touch lead along the thickness direction; or the special-shaped touch unit only comprises the at least one second special-shaped touch electrode block, a first touch electrode block of one of the first touch units adjacent to the special-shaped touch unit is in direct contact with the first special-shaped touch lead, the second special-shaped touch lead is connected with the second special-shaped touch electrode block, and the first special-shaped touch lead and the second special-shaped touch lead are insulated from each other and the orthographic projection of the first special-shaped touch lead is intersected with the orthographic projection of the second special-shaped touch lead along the thickness direction.

5. The touch display panel of claim 1, wherein the special-shaped touch unit is arranged inside at least one of the first touch electrodes or the second touch electrodes to dispose at least one of the first touch electrodes and the second touch electrodes discontinuously; and when the special-shaped touch unit is arranged inside the first touch electrodes, the special-shaped touch unit is located between two adjacent first touch units along the first direction, the first special-shaped touch lead is located between two adjacent first touch units along the first direction, the first special-shaped touch lead is located between two adjacent first touch electrode blocks along the first direction; and when the special-shaped touch unit is arranged inside the second touch electrodes, the special-shaped touch unit is located between two adjacent second touch units along the second direction, the second special-shaped touch lead is located between two adjacent second touch units along the second direction, the second special-shaped touch lead is located between two adjacent second touch electrode blocks along the second direction.

6. The touch display panel of claim 5, wherein the at least one special-shaped touch unit comprises one special-shaped touch unit, and the first touch electrodes and the second touch electrodes are disposed discontinuously by the special-shaped touch unit, in the case that the special-shaped touch unit only comprises the first special-shaped touch electrode block, the first special-shaped touch lead is electrically connected with the first special-shaped touch electrode block, and a second touch electrode block of one of the first touch units adjacent to the special-shaped touch unit is in direct contact with the second special-shaped touch lead, and the first special-shaped touch lead and the second special-shaped touch lead are insulated from each other and the orthographic projection of the first special-shaped touch lead is intersected with the orthographic projection of the second special-shaped touch lead along the thickness direction to form the special-shaped touch compensation capacitor.

7. The touch display panel of claim 5, wherein the at least one special-shaped touch unit comprises one special-shaped touch unit, and the first touch electrodes and the second touch electrodes are disposed discontinuously by the special-shaped touch unit, in the case that the special-shaped touch unit only comprises the second special-shaped touch electrode block, the second special-shaped touch lead is electrically connected with the second special-shaped touch electrode block, and the first special-shaped touch lead is electrically connected with a first touch electrode block of one of the first touch units adjacent to the special-shaped touch unit, and the first special-shaped touch lead and the second special-shaped touch lead are insulated from each other and the orthographic projection of the first special-shaped touch lead is intersected with the orthographic projection of the second special-shaped touch lead along the thickness direction to form the special-shaped touch compensation capacitor.

8. The touch display panel of claim 5, wherein the at least one special-shaped touch unit comprises one special-shaped touch unit, and the first touch electrodes and the second touch electrodes are disposed discontinuously by the special-shaped touch unit, in the case that one of the at least one special-shaped touch unit comprises two first special-shaped touch electrode blocks arranged along the first direction, and two second special-shaped touch electrode blocks arranged along the second direction, the two first special-shaped touch electrode blocks are electrically connected through the first special-shaped touch lead, the two second special-shaped touch electrode blocks are electrically connected through the second special-shaped touch lead, and the first special-shaped touch lead and the second special-shaped touch lead are insulated from each other and the orthographic projection of the first special-shaped touch lead is intersected with the orthographic projection of the second special-shaped touch lead along the thickness direction.

9. The touch display panel of claim 5, wherein the at least one special-shaped touch unit comprises one special-shaped touch unit, and the first touch electrodes or the second touch electrodes are disposed discontinuously by the special-shaped touch unit, the at least one special-shaped touch unit is located at ends of one of the first touch electrodes and the second touch electrodes and inside the other.

10. The touch display panel of claim 9, wherein when one of the at least one special-shaped touch unit comprises both the first special-shaped touch electrode block and the second special-shaped touch electrode block, the first special-shaped touch lead is electrically connected with the first special-shaped touch electrode block, and the second special-shaped touch lead is electrically connected with the second special-shaped touch electrode block, and the first special-shaped touch lead and the second special-shaped touch lead are insulated from each other and the orthographic projection of the first special-shaped touch lead is intersected with the orthographic projection of the second special-shaped touch lead along the thickness direction to form the special-shaped touch compensation capacitor.

11. The touch display panel of claim 9, wherein when the special-shaped touch unit only comprises the first special-shaped touch electrode block, and the first touch electrodes are disconnected, the first special-shaped touch lead is electrically connected with the first special-shaped touch electrode block, and the second special-shaped touch lead is in direct contact with a second touch electrode block of an adjacent first touch unit, and the first special-shaped touch lead and the second special-shaped touch lead are insulated from each other and the orthographic projection of the first special-shaped touch lead is intersected with the orthographic projection of the second special-shaped touch lead along the thickness direction to form the special-shaped touch compensation capacitor.

12. The touch display panel of claim 9, wherein when the special-shaped touch unit only comprises the second special-shaped touch electrode block, and the second touch electrodes are disconnected, the first special-shaped touch lead is electrically connected with a first touch electrode block of an adjacent first touch unit, the second special-shaped touch lead is electrically connected with the second special-shaped touch electrode block, and the first special-shaped touch lead and the second special-shaped touch lead are insulated from each other and the orthographic projection of the first special-shaped touch lead is intersected with the orthographic projection of the second special-shaped touch lead along the thickness direction to form the special-shaped touch compensation capacitor.

13. The touch display panel of claim 1, wherein the at least one special-shaped touch unit comprises two special-shaped touch units adjacent along the first direction,
the two special-shaped touch units are arranged inside of the first touch electrodes and configured to dispose the first touch electrodes discontinuously,
when each of the at least one special-shaped touch unit comprises both the first special-shaped touch electrode block and the second special-shaped touch electrode block, the first special-shaped touch lead is set as one first special-shaped touch lead connected with both first special-shaped touch electrode blocks of the two special-shaped touch units, and the second special-shaped touch lead is set as a plurality of second special-shaped touch leads electrically connected with second special-shaped touch electrode blocks of the two special-shaped touch units respectively, the one first special-shaped touch lead and the plurality of second special-shaped touch leads are insulated from each other and the orthographic projection of the first special-shaped touch lead is intersected with the orthographic projection of the second special-shaped touch lead along the thickness direction to form the special-shaped touch compensation capacitor.

14. The touch display panel of claim 1, wherein the at least one special-shaped touch unit comprises two special-shaped touch units adjacent along the second direction,
the two special-shaped touch units are arranged inside the second touch electrodes and configured to dispose the second touch electrodes discontinuously,
when each of the at least one special-shaped touch unit comprises both the first special-shaped touch electrode block and the second special-shaped touch electrode block, the first special-shaped touch lead is set as a plurality of first special-shaped touch electrode leads electrically connected with first special-shaped touch electrode blocks of the two special-shaped touch units respectively, and the second special-shaped touch lead is set as one second special-shaped touch lead simultaneously connected with second special-shaped touch electrode blocks of the two special-shaped touch units, and the plurality of first special-shaped touch leads and the one second special-shaped touch lead cross and are insulated from each other.

15. The touch display panel of claim 1, wherein the at least one special-shaped touch unit comprises more than two special-shaped touch units, and the more than two special-shaped touch units are arranged inside the first touch electrodes and configured to dispose the first touch electrodes discontinuously,
when each of the at least one special-shaped touch unit comprises both the first special-shaped touch electrode block and the second special-shaped touch electrode block, the first special-shaped touch lead is arranged as one first special-shaped touch lead electrically connected with first special-shaped touch electrode blocks at both ends of the more than two special-shaped touch units, and the second special-shaped touch lead is arranged as a plurality of second special-shaped touch lead electrically connected with second special-shaped touch electrode blocks of more than two adjacent special-shaped touch units respectively, the one first special-shaped touch lead and the plurality of second special-shaped touch leads are insulated from each other and the orthographic projection of the first special-shaped touch lead is intersected with the orthographic projection of the second special-shaped touch lead along the thickness direction to form a plurality of special-shaped touch compensation capacitors.

16. The touch display panel of claim 1, wherein each first touch unit further comprises a first bridge point located at the overlap of the first touch electrode blocks and the second touch electrode blocks; and
vertical projection of the first special-shaped touch electrode block and vertical projection of the second special-shaped touch electrode block of the special-shaped touch unit are non-overlapped.

17. A touch display device, comprising the touch display panel of claim 1.

18. The touch display panel of claim 1, wherein the slot is located between two adjacent first touch units along the first direction or the second direction.

19. The touch display panel of claim 1, further comprising an earpiece or a front camera, wherein the slot is located on a region of the touch film layer corresponding to the earpiece or the front camera.

* * * * *